April 8, 1969

E. E. METEVIA 3,436,836

BOREHOLE MEASURING DEVICE

Filed April 26, 1966

INVENTOR
EDWIN E. METEVIA

BY *James L. O'Brien*

ATTORNEY

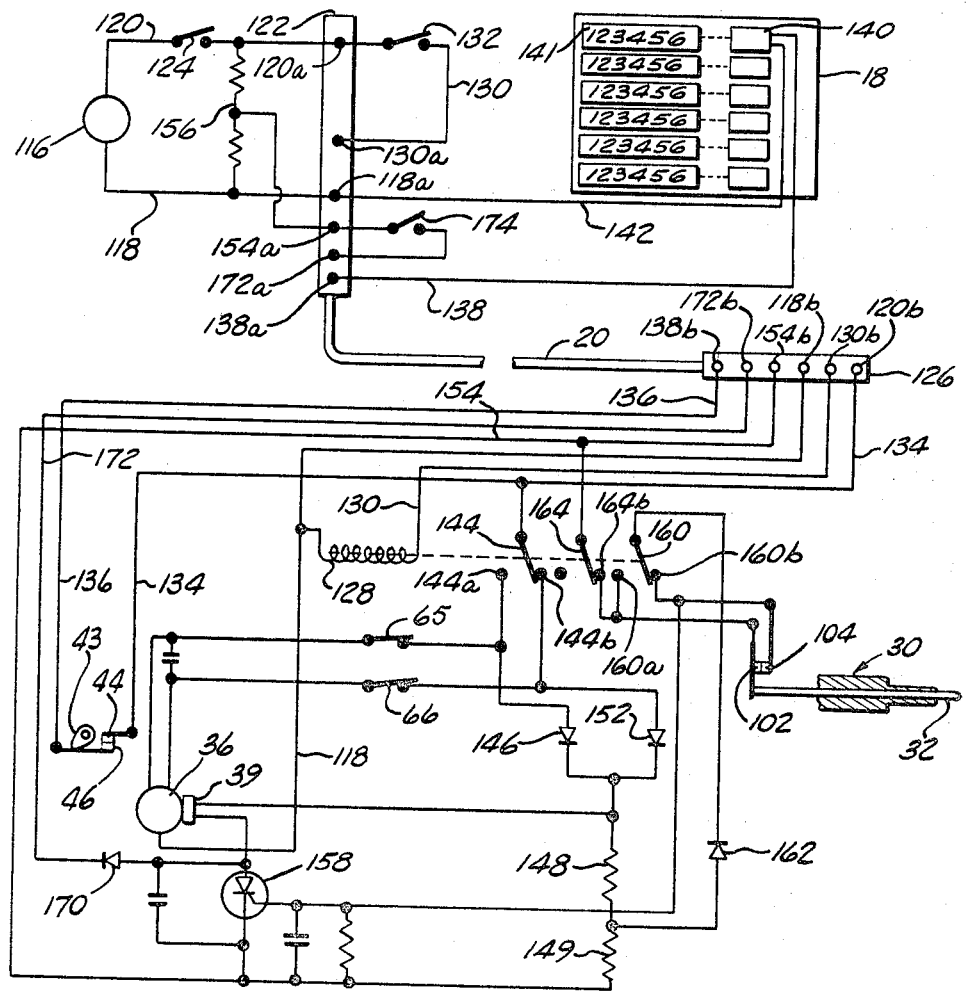
FIG. 6
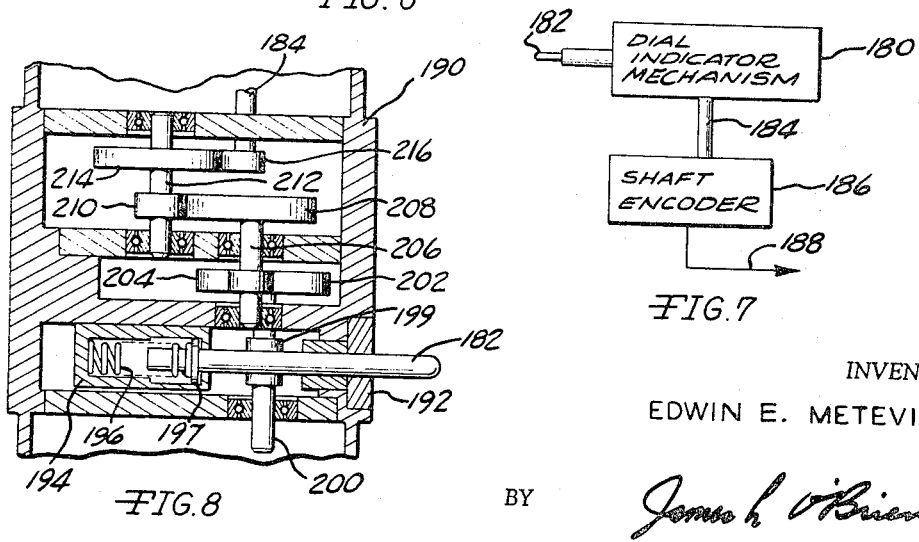
FIG. 8
FIG. 7
INVENTOR
EDWIN E. METEVIA

# United States Patent Office 3,436,836
Patented Apr. 8, 1969

3,436,836
BOREHOLE MEASURING DEVICE
Edwin E. Metevia, Ypsilanti, Mich., assignor to The Bendix Corporation, a corporation of Delaware
Filed Apr. 26, 1966, Ser. No. 545,396
Int. Cl. G01b 3/46
U.S. Cl. 33—178
1 Claim

ABSTRACT OF THE DISCLOSURE

A subsurface sensing unit lowerable through a borehole for measuring diametric variations wherein the unit has a movable probe for contacting the wall of the borehole and a digital converter operably connected to the probe for providing a digital signal indicative of the displacement of the probe.

---

This invention relates generally to borehole measuring devices and more particularly to an apparatus for measuring the diameter and diametrical variations of a borehole.

Knowledge of stress fields in subsurface geological formations can be obtained from measurements of diametrical variations of a borehole. One technique is based on the creep rate, or stated differently, the rate at which the borehole closes measured over a relatively long period of time. In conjunction with relatively recent deep subsurface exploration and deep mining operations, measurements must be taken in deep boreholes whose depth is on the order of miles. In borehole measurements generally, and particularly with deep boreholes, accurate measurements in the microinch range are desirable. Accuracy must be considered from the standpoint of repeatability, sensitivity, resolution and linearity. Conventional measuring techniques using linear transducers such as strain gauges, voltage transducers and sonic transducers which have analog outputs are either incapable of achieving the desired accuracy or they are economically impractical due to the temperature sensitivity of the transducers, excessive calibration, size, and low signal-to-noise ratios. In transmitting electrical signals from a subsurface unit through several thousand feet of wire substantial noise is mixed with the measurement signal to further impair accuracy in the indicated measurement. Although this could be reduced by using shielded cables, the use of shielded cables is expensive and not totally effective. Preamplification in the hole requires extreme stability that cannot be achieved in a manner that is economically feasible for many applications.

Another problem in measuring a borehole with microinch accuracy arises because the borehole is of nominal diameter and indeed quite irregular. Thus the various probes which actually contact the borehole wall must be adjustable over a large displacement range to compensate for the nominal size of the borehole, for example, a range of one inch, without affecting the measuring accuracy over relatively small displacements.

The objects of the present invention are to provide apparatus for measuring the diameter and diametrical variations of a borehole or the like that are accurate; that are low cost relative to prior measuring apparatus; and that operate effectively in deep boreholes, in boreholes having only nominal diameters, and over wide variations in environmental conditions.

Other objects, features and advantages of the present invention will become apparent from the following description, the appended claim, and the accompanying drawings in which:

FIGURE 6 is a circuit diagram of the electrical control and the indicator for the sensing unit;

FIGURE 7 is a schematic block diagram of another embodiment of a sensing unit of the present invention; and FIGURE 8 is a sectional view of a dial indicating mechanism in the embodiment shown in FIG. 7.

Figure 1:
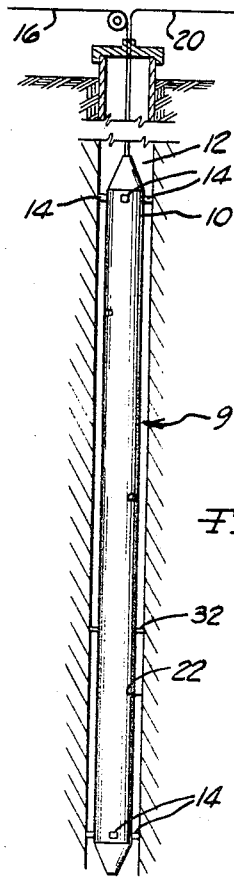
FIGURE 1 is an elevational view, partly in section and schematic form, illustrating a borehole measuring device disposed in a borehole.
Figure 2:
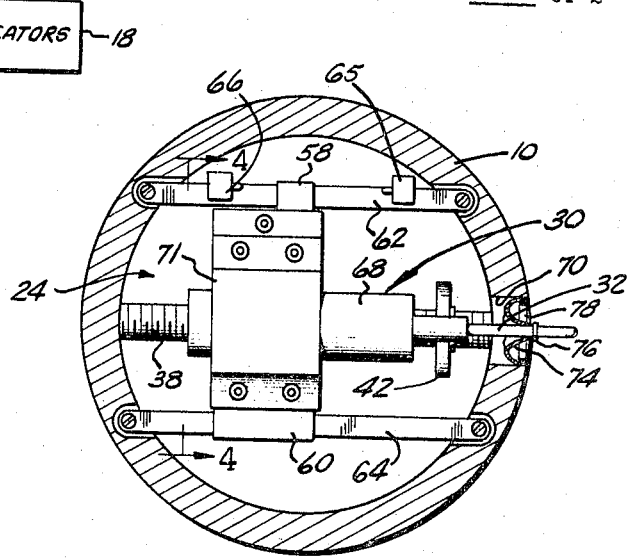
FIGURE 2 is a top view of one of six sensing units constructed in accordance with one embodiment of the present invention and usable in the measuring device illustrated in FIG. 1.

The measuring device of the present invention includes a subsurface unit 9 having an elongated tubular housing 10 and disposed in a borehole 12. The housing 10 is secured in position in the borehole 12 by three radial arms 14 at the top and three at the bottom. A cable 16 fastened to the housing and extending to the earth's surface is used to lower the housing 10 into the borehole in a conventional manner. The subsurface unit 9 is also connected to indicators 18 located at the earth's surface through an electrical cable 20. Six sensing units, one of which is illustrated in detail in FIGS. 2–6 and designated generally by numeral 24, are arranged in pairs spaced circumferentially and longitudinally along the housing 10 in a generally conventional configuration. Each of sensing units 24 comprises a probe 30 having a movable sensing member 32 which projects from the probe radially outwardly through housing 10 into engagement with the wall 22. In accordance with one aspect of the present invention when the sensing member 32 is deployed into engagement with wall 22, displacement of the probe 30 is converted to a corresponding digital signal which is transmitted to the indicators 18. In accordance with another aspect of the present invention, as the hole 12 closes, the wall 22 displaces the sensing member 32 and the displacement is converted to a corresponding digital signal which is transmitted to indicators 18.

More particularly each sensing unit 24 comprises a reversible motor 36 (FIGS. 3 and 6) which is drivingly connected to a precision lead screw 38 through an electromagnetic clutch 39, a gear train 40 and a drive gear 42 which is nonrotatably fastened on the screw 38. The gear train 40 also drives a cam 43 which operates a pair of electrical contacts 44, 46. Screw 38 extends diametrically across the housing 10 and is journaled in the housing at one end by a bearing 48 and at its other end by a bearing 50. Screw 38 is threaded through a precision carriage nut 54 which is nonrotatably fastened in the split lower end of a carriage block 56 by a screw 57. The block 56 has a pair of integral guide blocks 58, 60 which project outwardly in opposite lateral directions and ride on respective guide rails 62, 64 which in turn are fastened on the housing 10. A forward travel limit switch 65 and rearward travel limit switch 66 are mounted on the rail 62 to be operated by block 58.

The probe 30 has a body member portion 68 rigidly clamped in the upper portion of the carriage block 56 by a yoke 71 with the probe extending generally diametrically of the housing 10 parallel to screw 38. The sensing member 32 is slidably mounted in the body member 68 for rectilinear motion along the longitudinal axis of the sensing member and projects radially outwardly from the body member 68 through an aperture 70 in the housing 10. The outer tip of the sensing member 32 can be engaged with the wall 22 of the borehole 12 when the sensing member is in its extended position illustrated in FIGS 2 and 3. A thin flexible diaphragm 74 is fastened at its inner periphery on the sensing member 32 by a ring 76 and at its outer periphery in the hole 70 by a ring 78. Diaphragm 74 serves as a flexible seal without impairing free motion of the sensing element 32.

The internal construction, per se, of the probe 30 is not an essential feature of the present invention since commercially available probes can be used with only simple modifications. One such probe is manufactured by Carl Mahr Esslingen, A.N. and is sold commercially under the designation Electrical Comparator Elmess–1100. Thus probe 30 will be described in detail only to the extent necessary for an understanding of the present invention. Referring to the internal construction of the probe 30 as illustrated schematically in FIG. 5, the sensing element 32 extends into the hollow body member 68 through a guide 80 which is fastened on the body member 68. An integral radial flange 82 on element 32 is disposed in front of the guide 80 and a spring 84 is mounted in compression between the guide 80 and the flange 82 to urge the sensing element 32 radially outwardly toward its fully extended position. Flange 82 is arranged to bottom on a shoulder 86 of the body member 68 and limit outward travel of the sensing element 32. Adjacent to the inner end of the sensing element 32 is a bell crank contact arm 88 which is pivoted on the body member 68 by a shaft 90. One portion 92 of the arm 88 projects upwardly from the shaft 90 through a slot 94 in the sensing element 32 and is engaged by a spring 96. Spring 96 is mounted in compression between the arm portion 92 and an internal wall 98 on the sensing element 32 to urge arm 88 in counterclockwise direction about shaft 90. The other portion 100 of the arm 88 extends rearwardly from the shaft 90 and carries an electrical contact 102 on its outer end. Contact 102 operates in conjunction with a stationary contact 104 which is fastened on the body member 68.

Figure 5:
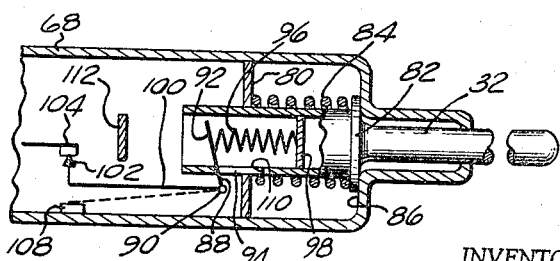
FIGURE 5 is a fragmentary side view partly broken away and in section, of a probe in the sensing unit of FIGS. 2–4.

With the sensing element fully extended as illustrated in FIG. 5, the arm portion 92 is engaged by the rear end 108 of slot 94 to pivot the arm 88 in a clockwise direction and maintain contacts 102, 104 closed. As the sensing element 32 retracts in a direction from right to left as viewed in FIG. 5, the spring 96 urges the arm 88 in a counterclockwise direction so that the arm portion 100 moves downwardly toward a stop 108 and the contacts 102, 104 open. After the arm portion 100 bottoms on the stop 108, continued motion of the sensing element 32 relative to the body element 68 further compresses the spring 96 until a front end 110 of the slot 94 engages the arm portion 92. A stop 112 fastened on the body member 68 engages the rear end of the sensing element 32 when the front end 110 of slot 94 engages the arm portion 92 to limit further relative motion between the sensing element 32 and the body element 68.

Figure 3:
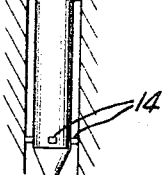
FIGURE 3 is a side elevational view of the sensing unit of FIG. 2 partly in cross section and partly in schematic form.
Figure 3:
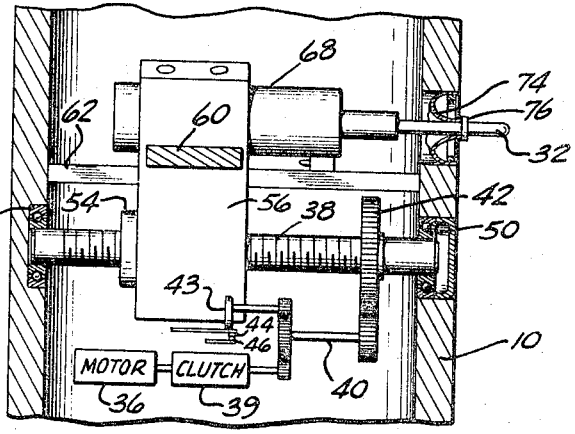
Figure 4:
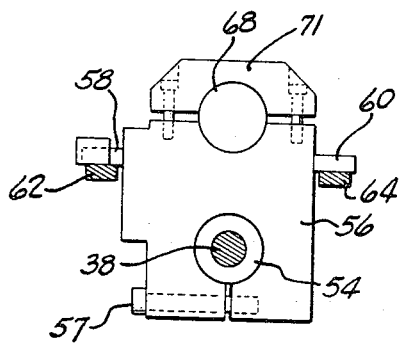
FIGURE 4 is an end view of the sensing unit taken on line 4—4 of FIG. 2.

The circuit for one of the sensing units 24 illustrated in FIG. 6 generally comprises an alternating current power supply 116 which is connected by a pair of main conductors 118, 120 to corresponding terminals 118a, 120a on a terminal board 122. A main on-off switch 124 is inserted in the conductor 120. The terminal board 122 is located at the earth's surface and the conductors 118, 120 are connected via the cable 20 to corresponding terminals 118b, 120b on a terminal board 126 located in the housing 10. The terminal 118b is connected via conductor 118 to the motor 36 (FIGS. 3 and 6) and to one end of a relay coil 128. The other end of coil 128 is connected to the conductor 120 via a conductor 130, terminal 130b, cable 20, terminal 130a and a switch 132. Switch 132 operates motor 36 in either forward or reverse directions as will later be apparent. The terminal 120b is connected via a conductor 134 to one of the contacts 44 (FIGS. 3 and 6).

The other contact 46 is connected to conductor 118 via a conductor 136, a terminal 138b, cable 20, a terminal 138a, a conductor 138, a stepping motor 140, a conductor 142, and the terminal 118a. Motor 140 drives a stepping counter 141 in the indicator 18.

The terminal 120b is also connected through a switch arm 144 having contacts 144a, 144b which are selectively closed by relay coil 128. Contact 144a is connected through the forward travel limit switch 65 to motor 36 and through a rectifier 146 to a voltage divider comprising resistors 148, 149. With motor 36 energized through contact 144a and clutch 39 engaged, motor 36 will turn screw 38 in a direction that moves the carriage block 56 forward. The other contact 144b is connected through limit switch 66 to motor 36 and through a rectifier 152 to the resistors 148, 149. With motor 36 energized through contact 144b and clutch 39 energized, motor 36 will turn screw 38 in a direction that moves the carriage block 56 rearward. Resistor 149 is in turn connected via a conductor 154, a terminal 154b, cable 20, and a terminal 154a to a voltage divider 156 which in turn is connected across the power supply 116. The clutch 39 is connected in series with a silicon controlled rectifier 158 across the voltage divider comprised of resistors 148, 149. The gate electrode of the rectifier 158 is connected to one contact 160b of a switch arm 160 and the gate is also connected to the stationary contact 104 in the probe 30. The arm 160 is in turn connected through a blocking diode 162 to a point between resistors 148, 149. The other contact 102 which is operated by the sensing element 32 is connected to the other contact 160a of the switch arm 160 and to one contact 164b of the switch arm 164. The switch arm 164 is in turn connected to the conductor 154. A diode 170 is arranged to be connected in shunt across the silicon control rectifier 158 through a conductor 172, terminal 172b, cable 20, terminal 172a, a switch 174 and terminal 154a. Switch 174 and diode 170 permit an operator to override the control of the rectifier 158 and manually operate the clutch 39.

In the operation of the measuring apparatus of the present invention, the housing 10 is lowered into the borehole 12 and is fastened in place by suitable remote controlled means (not shown) which move the support arms 14 into engagement with the wall 22. While the housing 10 is lowered into the borehole 12 the sensing elements 32 are retracted inside housing 10 and the contacts 102, 104 are closed. Operation of the measuring apparatus can be divided into two different modes. The first is a deployment mode during which the sensing element 32 is moved in a direction radially outwardly into engagement with the wall 22 of the borehole 12 and a diameter measurement is made. At the completion of the deployment mode the sensing element 32 will be positioned to respond to closure of the borehole and the apparatus is switched to a measuring mode to measure the creep rate of the borehole.

To deploy the sensing element 32 outwardly into engagement with the wall 22 the main on-off switch 124 is closed to energize the circuit and then the switch 132 is closed to energize relay coil 128. When coil 128 is energized, contact 144a is connected to conductor 134 by the switch arm 144 and motor 36 will be energized in a direction which will drive the carriage block 56 radially outwardly when clutch 39 is engaged. Additionally when the coil 128 is energized the switch arm 164 disconnects contact 102 from the conductor 154 and the switch arm 160 connects the contact 102 to the voltage divider comprising resistors 148, 149. Thus a positive gating voltage will be applied from the resistors 148, 149 to the gate electrode of rectifier 158 through the rectifier 162, switch arm 160, contact 160a, contact 102, and contact 104. When rectifier 158 conducts the clutch 39 is energized and motor 36 drives screws 38 in a direction that moves the carriage block 56 and the probe 30 forward, in a direction from left to right as viewed in FIGS. 2 and 3, until the sensing element 32 engages the wall 22 of the borehole 12.

As soon as the sensing element 32 engages the wall 22, the sensing element moves rearwardly relative to the body element 68 and the contacts 102, 104 are opened by spring 96. When contacts 102, 104 open the positive gating voltage is removed from rectifier 158 and clutch 39 is de-energized to disconnect the screw 38 from the motor 36. Diode 162 serves to minimize sparking between the contacts 102, 104 when the contacts reclose. As soon as conduction of the rectifier 158 is initiated during each positive half-cycle, the diode 162 is reverse biased during the remainder of that half cycle. During negative half-cycles rectifiers 146, 152 are nonconducting and therefore there is only a short interval at the beginning of each positive half cycle during which any potential appears across contacts 102, 104 when they are open.

During the interval that the clutch 39 is engaged and the probe 30 is being deployed outwardly into engagement with the borehole wall 22, the cam 42 will intermittently open and close the contacts 44, 46. Each time contacts 44, 46 close an electrical pulse is supplied to the stepping motor 140 in the indicators 18 to increment the counter 141. When the sensing element 32 engages the wall 22 and clutch 39 is disengaged to disconnect motor 36 from gear train 40, the total number of pulses produced by repeated closure of contacts 44, 46 will represent the total displacement of the sensing element 32. The initial position of the probes can be predetermined so that the diameter of borehole 12 can be determined from the displacement of one or more probes.

After the initial diameter of the borehole 12 is obtained, switch 132 is open to set the apparatus in the measuring mode. When switch 132 is opened, coil 128 is de-energized and contact 144b is connected to conductor 154 to operate motor 36 in a direction that will retract the carriage block 56 and the probe 30 when the clutch 39 is engaged. So long as contacts 102, 104 are closed, the rectifier 158 remains off since the gate of the rectifier is shorted to the cathode through contact 104, contact 102, contact 164b, switch arm 164 and conductor 154. However, as the borehole 12 closes, the sensing element 132 is urged in a direction from right to left as viewed in FIG. 5 and contacts 102, 104 will be opened by the spring 96 to remove the short across resistor 149 and apply a positive gating voltage to the rectifier 158 through contact 160b, arm 160 and rectifier 162. When contacts 102, 104 open, rectifier 158 conducts to energize clutch 39 so that motor 36 is connected to screw 38. The body portion 68 is retracted by carriage block 56 in a direction away from the wall 22, from right to left as viewed in FIG. 5. During retraction the body member moves relative to the sensing member until the arm portion 92 of the contact arm 88 is engaged by the rear end of the slot 94 to close the contacts 102, 104. When contacts 102, 104 close, the positive gating voltage across resistor 149 is again shorted and the rectifier 158 stops conducting to de-energize clutch 39 and disconnect motor 36 from screw 38. Diode 162 minimizes arcing on reclosure of contacts 102, 104 in the manner previously set forth.

During the measuring mode while probe 30 is being retracted by motor 36, cam 42 will repeatedly open and close the contacts 44, 46. With each closure of contacts 44, 46 an electrical pulse is transmitted to the stepping motor 140 to increment counter 141. The number of pulses supplied to the motor 140 represents the displacement of the probe required to reclose the contacts 102, 104 and will thus represent the diametrical variation of the borehole during closure. The displacement indicated by counter 141 over a long period of time will yield the creep rate of the borehole. If during the measuring mode the apparatus is turned off by opening switch 124, continued decreases in the diameter of the borehole 12 will be stored in the spring 96 within the limits provided by the slot 94. When the apparatus is again turned on the probe 30 will be retracted by the motor 36 and contacts 102, 104 will not close until the displacement stored spring 96 is taken up.

The measuring apparatus described above achieves a high degree of accuracy during the measuring mode. By way of illustration, for one application of the present invention the gear ratios of the gear train 40 and the pitch of screw 38 were chosen such that each pulse produced by the closure of contacts 44, 46 corresponded to a five microinch displacement of the sensing member 32. This accuracy can be achieved by using a conventional micrometer screw (screw 38) having forty threads per inch so that one revolution represents a displacement of 0.025 inch and by selecting the gear train 40 such that cam 42 provides 5000 pulses for one revolution of the screw 38. By relatively simple modification in the input for the stepping motor 140, the counter 141 can be incremented in one direction during the deployment mode and incremented in the opposite direction during the measuring mode. Although a small displacement is used for the measuring mode, for example a displacement in the order of 0.25 inch, a relatively long travel of one inch or more in available during the deployment mode by moving the entire probe including the body element 68 and the sensing element 32. Thus the probe can be used effectively in irregular shaped holes whose diameter at any given point may vary substantially from the nominal diameter of the hole. Additional accuracy is achieved during the measuring mode, since the screw 38 and the gear train 40 turn in one direction only, eliminating any errors due to gear backlash and the accuracy of gears is not affected by electromagnetic radiation or nominal temperature variations. Error arising from the repeatability of the electrical contacts is minimized by minimizing the likelihood of arcing during closure of the contacts 102, 104. The digital signals produced by the contacts can be transmitted to the indicators 18 at high signal-to-noise ratios using unshielded cables.

The use of a digital signal for transmitting a measurement signal from a deep borehole to a surface indicating unit is also employed in the embodiment illustrated in FIGS. 7 and 8. As shown schematically in block form in FIG. 7, a dial indicator mechanism 180 includes a probe 182. Rectilinear motion of the probe 182 caused by closure of a borehole is converted by the mechanism 180 into rotary motion of an output shaft 184. The mechanism 180 resembles conventional dial indicators in construction and operation except that the usual dial and pointer are removed. Thus the dial indicator mechanism 180 multiplies rectilinear displacement of probe 182 to a substantially greater and more easily detected rotary displacement of the shaft 184. Shaft 184 in turn drives a shaft encoder 186 which converts an angular displacement of the shaft 184 into a digital signal at an output line 188 of the encoder 186. The digital output of the encoder 186 can be transmitted to a surface indicator without using shielded leads to operate a stepping motor and counter corresponding to the stepping motor 140 and counter 141 illustrated in FIG. 6.

As illustrated in FIG. 8, the mechanism 180 is substantially similar to a conventional dial indicator mechanism and comprises a hollow housing 190 in which the probe 182 is mounted for rectilinear motion along its longitudinal axis. The probe 182 extends through a guide member 192 of the house 190 with the rear end of the probe 182 disposed in a hollow guide block 194. Probe 182 is urged toward its extend position by a compression spring 196 which bears against a radial flange 197 on the probe 182. The probe 182 engages a roller 199 which is mounted on a shaft 200 journaled on the housing 190. Angular displacement of the shaft 200 is transmitted to the output shaft 184 by means of rollers 202, 204, shaft 206, rollers 208, 210, shaft 202 and rollers 214, 216. Each of the rollers have smooth peripheral faces and one of the rollers in each of the roller pairs (rollers 202, 204, rollers 208, 210 and rollers 214, 216) has a resilient tread that is preloaded in slight radial compression where it engages the other roller in the pair to assure smooth, continuous and linear opeartion of the dial indicator mechanism. Similarly the roller 199 has a resilient tread that is preloaded in contact with the probe 182 so that conversion of rectilinear motion of the probe 182 into rotary motion of the shaft 200 is smooth, continuous and linear. A suitable deployment mechanism (not shown) is used to drive shaft 200 and extend probe 182 during a deployment mode until the probe 182 is acted upon by a retractive force when it engages the wall of the borehole. Accurate creep rate measurements can be obtained with the measuring device described in conjunction with FIGS. 7 and 8 by selecting the rollers so that a displacement of the probe 182 in the order of 0.25 inch is converted to seven revolutions of shaft 184. The shaft encoder 186 provides four thousand pulses for each revolution or a total of 28,000 pulses for 0.25 inch displacement representing a resolution of less than ten microinches per pulse.

It will be understood that the borehole measuring instruments have been described and disclosed herein for purposes of illustration and explanation and are not intended to indicate limits of the invention, the scope of which is defined by the following claim.

I claim:

1. In an apparatus for measuring diametric variations in a borehole or the like, a subsurface sensing unit lowerable into a borehole, said sensing unit having a movable probe comprising a body, a sensing member being adapted to contact the wall of the borehole, and resilient means mounting said sensing member to said body, said resilient means urging said sensing member toward said wall to a fully extended position with respect to said body, said sensing unit further comprising conversion means responsive to an arbitrary displacement of said probe relative to said unit to provide a signal representative of said arbitrary displacement, transmission means operably coupled to said sensing unit to transmit said signal to a remote location, indicator means responsive to said signal being periodically operative to provide indications representing said arbitrary displacement, contact means for providing a signal when said sensing member is not in said fully extended position, and means for retracting said probe in response to said contact means signal when said indicator means is operative and said sensing member is not in said fully extended position, thereby providing means for storing displacements of said sensing member when said indicator means is not operative.

References Cited

UNITED STATES PATENTS

| | | |
|---|---|---|
| 2,724,183 | 11/1955 | Edison. |
| 2,899,751 | 8/1959 | Mayes _____ 33—126.6 |
| 3,007,134 | 10/1961 | Kolb _____ 340—18 |
| 2,150,070 | 3/1939 | Kregecz. |
| 2,554,171 | 5/1951 | Brunot et al. |
| 2,865,103 | 12/1958 | Lolley et al. |
| 2,906,026 | 9/1959 | Hanes. |
| 3,276,131 | 10/1966 | Hahn. |

SAMUEL S. MATTHEWS, *Primary Examiner.*